No. 754,887. Patented March 15, 1904.

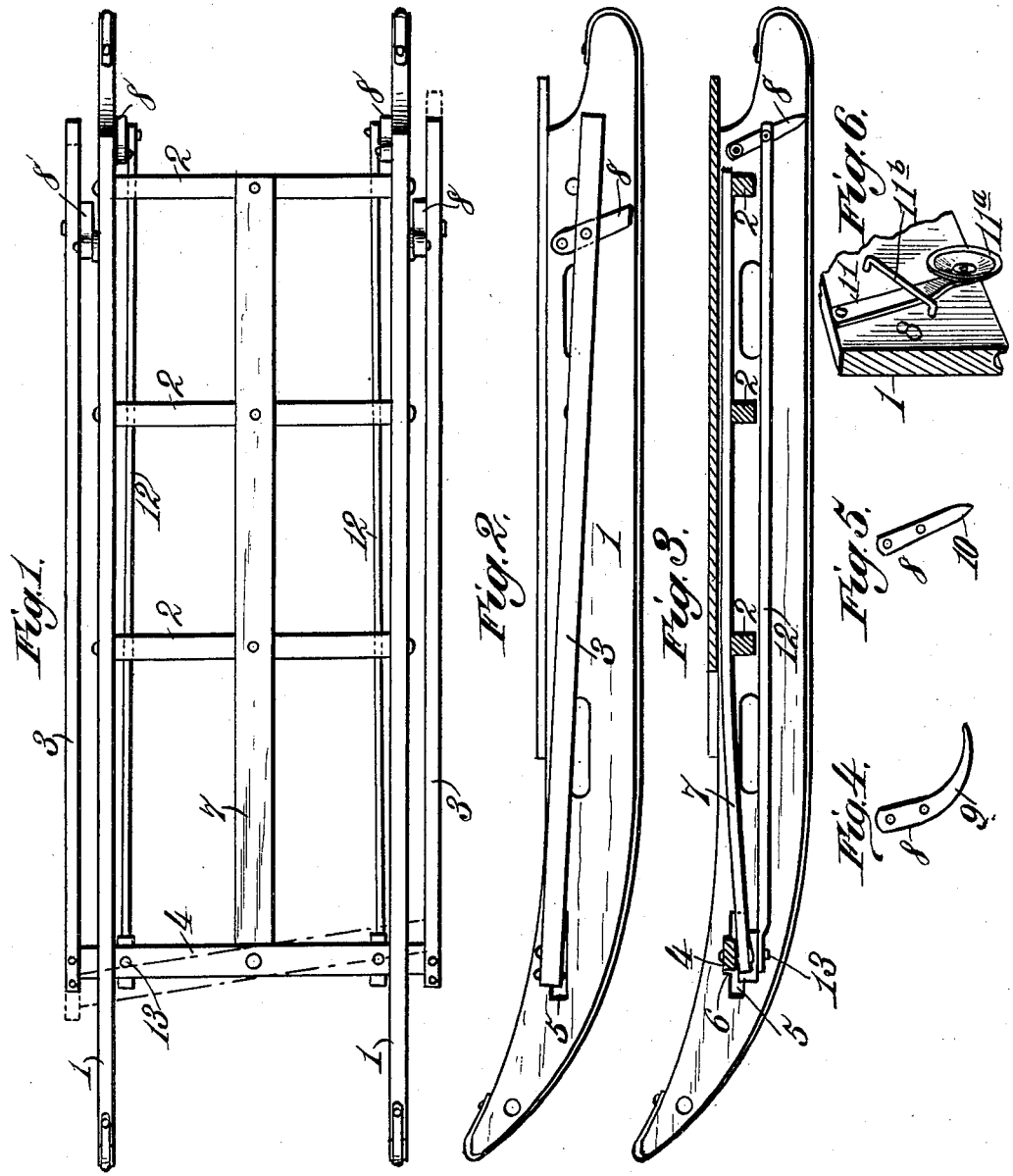

UNITED STATES PATENT OFFICE.

WILBUR F. PARMELEE, OF KALAMAZOO, MICHIGAN.

COASTING-SLED.

SPECIFICATION forming part of Letters Patent No. 754,887, dated March 15, 1904.

Application filed June 17, 1903. Serial No. 161,929. (No model.)

*To all whom it may concern:*

Be it known that I, WILBUR F. PARMELEE, a citizen of the United States, residing at Kalamazoo, in the county of Kalamazoo and State of Michigan, have invented new and useful Improvements in Coasting-Sleds, of which the following is a specification.

This invention relates to coasting-sleds.

The object of the invention is in a ready, simple, and thoroughly-practical manner and without danger to the operator to effect positive guiding of a coasting-sled either by the hands or feet of the rider; furthermore, to adapt the invention to an ordinary sled without requiring any objectionable change in its structural arrangement; furthermore, to effect the normal holding of the steering mechanism out of operative position when its use is not required and for automatically returning it to inoperative position after having been actuated for steering purposes; furthermore, to dispose the parts of a steering mechanism in such manner as to preclude possibility of injury to a rider therefrom.

The steering mechanism of this invention embodies, generally stated, frictional steering devices combined with means for throwing the said devices into operative position when desired and with means operating automatically to move the said devices out of operative position and for holding them thus when their use is not required. As will hereinafter appear, in the sled shown in this instance there are two sets of steering devices employed, arranged on opposite sides of the runners, and operable from a single actuating device, which constitutes also a locking means for preventing accidental application of the steering devices. The steering devices may constitute either shoes, spikes, or disks, it being immaterial which of the three forms be employed, the object had in view being to cause the coaction between the steering device and the ice or snow over which the sled is traveling to be such that when such device is brought into operative position the sled will be caused to swerve to the right or left, as may be desired. This may be effected by the employment of a pair of steering devices in connection with each runner, as shown; but, if preferred, but a single steering device may be employed in connection with each runner and may be disposed either upon the outer side or inner side thereof. Where disposed upon the inner sides of the runners, the steering means, which will be in the nature of a rod, will be entirely removed from contact with the rider and practically removed from his reach. Where disposed upon the outer sides of the runner, the steering-rods will, in effect, constitute raves, by which the handling of the sled will be facilitated. While it will generally be preferred to operate the locking mechanism of the steering devices either by hand or foot power, in the former instance when the rider is lying flat upon the sled and in the latter instance when seated thereon, if preferred, a drawing-rope may be combined with the locking mechanism, and this may be employed as a means for swinging the locking device to bring the steering mechanism at either side of the sled into engagement with the surface over which the sled is traveling.

With the above stated and other objects in view, as will appear as the nature of the invention is better understood, the same consists in the novel construction and combination of parts of a steering device for coasting-sleds, as will be hereinafter fully described and claimed.

In the accompanying drawings, forming a part of this specification, and in which like characters of reference indicate corresponding parts, there is illustrated one form of embodiment of the invention, together with three different forms of steering devices, it being understood that the elements therein exhibited may be varied or changed as to shape, proportion, and exact manner of assemblage without departing from the spirit thereof.

In the drawings, Figure 1 is a view in plan of the frame of the sled with the steering mechanism combined therewith, the seat being removed. Fig. 2 is a view in side elevation. Fig. 3 is a view in longitudinal section, and Figs. 4, 5, and 6 are detail views of different forms of steering devices that may be employed.

Referring to the drawings, 1 designates the runners of the sled, which may be of the usual or any preferred construction and are connected and rendered rigid by cross-braces 2, of which there are shown three in this instance, although, if preferred, a greater or lesser number may be employed.

The steering mechanism when disposed upon the outer sides of the runners comprises steering-rods 3, which also constitute raves, the forward ends of which are connected with a locking-bar 4, the ends of which project through openings 5, arranged near the forward ends of the runners. The lower or base portion of each opening is of a length to permit a limited lateral swing of the locking-bar 4, while the upper portion thereof is provided with a recess or locking-notch 6, which is of a width practically the same as the locking-bar, so that when the latter is in engagement with this portion of the openings it will be held positively against movement, and when thus positioned, as will presently appear, the steering devices are held above the plane of the lower face of the runners. The locking-bar is held in engagement with the locking-notches through the medium of a spring-bar 7, which, as clearly shown in Fig. 1, is secured to the upper sides of the cross-bars 2, but at its forward end is disposed under the locking-bar, thus normally to exert an upward pressure on the latter to keep it in engagement with the locking-notches. It will be understood, of course, that if preferred the spring-bar may be secured to the under sides of the cross-bars and to the upper side of the locking-bar and still be within the scope of the invention. While from a standpoint of simplicity and cheapness it will generally be preferred to employ the spring-bar 7, it is to be understood that the invention is not to be limited to its employment alone, as springs may be combined with the locking-bar for effecting the purpose designed without departing from the scope of the invention.

The rear ends of the steering-rods 3 are connected with the intermediate portions of the steering devices 8, which are suitably pivoted to the outer sides of the runners. These steering devices may be either in the form of a shoe 9, as shown in Fig. 4, a spike 10, as shown in Fig. 5, or an arm 11, carrying a disk 11ª, as shown in Fig. 6. Where the latter form of steering device is employed, the disks will be disposed at such angle with relation to the runners or arms as to throw the front edge of the disks inward toward the sled center, thus to cause the disks to revolve on the surface over which the sled travels, and thereby to effect positive and certain action to right or left for effecting steering. To hold the arms against outward movement, keepers 11ᵇ are employed. The said arms may be disposed either on the inside or outside of the runners, or either one or two may be combined with each runner, as may be preferred.

Where the steering mechanism is disposed upon the inner sides of the runners, two steering-rods 12 are employed, which are by preference disposed beneath the cross-bars 2 and connected at their forward ends with the locking-bar 4, preferably on its under side, through the medium of bolts or rivets 13, as clearly shown in Fig. 1. The rear ends of the steering-rods are pivotally connected to the intermediate portions of the steering devices 8, which may be either in the form of a shoe or a spike or a disk-bearing device, as above stated.

All of the parts of the sled described are constructed of materials that will combine lightness with strength and durability, and the manner of assembling the parts is such that liability of derangement or breakage in use will be reduced to a minimum. It will be noted that all of the operating mechanism is disposed below the plane of the seat, so that all danger of the rider being injured by projecting parts will be entirely obviated.

In the use of the sled so long as it is pursuing a determined course the steering devices will occupy the position shown in Fig. 2—that is, above the plane of the lower face of the runners. Should the necessity arise for shifting the course of the sled, the operator will press down upon the locking-bar either by his hands or his feet, thus to throw it out of engagement with the locking-notches, and a twisting motion will be imparted to the bar to bring the steering device or devices on one side of the sled into engagement with the surface over which it is passing, thus in a manner that will be perfectly apparent to effect the desired steering.

Where both sets of steering-rods are employed, the locking-bar will project outward beyond the outer sides of the runners, as clearly shown in Fig. 1; but when it is preferred to employ only the inner pair of brake-rods the projecting ends of the locking-bar may be removed, thus to lie flush with the outer faces of the runners, and thereby obviate the presentation of obstructions.

Having thus described the invention, what I claim is—

1. In a coasting-sled, pivoted steering devices, actuating means therefor embodying a locking-bar, and means for holding the locking-bar normally against operation.

2. In a coasting-sled, the combination of frictional steering devices, steering-rods connecting at one end therewith, a locking-bar connecting with the opposite ends of the steering-rods, and means for normally holding the locking-bar against movement.

3. In a coasting-sled, runners provided near their forward ends with longitudinal openings having their upper walls provided each with a locking-notch, a locking-bar arranged within the openings, means for holding the locking-bar normally in engagement with the locking-notches, steering devices, and steering-rods connecting with the locking-bar and with the steering devices.

4. In a coasting-sled, a steering device comprising a pivoted arm, and means for locking the same, and a disk carried by the arm and disposed at an angle with relation thereto.

5. In a coasting-sled, a steering device comprising a pivoted arm, and means for locking the same, and a disk carried thereby and inclined in front outward or inward from the runner.

In testimony whereof I have hereunto set my hand in presence of two subscribing witnesses.

WILBUR F. PARMELEE.

Witnesses:
 MAUDE E. LUCAS,
 S. H. VAN HORN.